June 15, 1965 J. D. McMICHAEL 3,189,179
REPLACEABLE FILTER CARTRIDGE FOR A DRY CLEANER
Filed July 18, 1962 3 Sheets-Sheet 1

INVENTOR.
John D. McMichael
BY
His Attorney

INVENTOR.
John D. McMichael
BY
His Attorney

June 15, 1965 J. D. McMICHAEL 3,189,179
REPLACEABLE FILTER CARTRIDGE FOR A DRY CLEANER
Filed July 18, 1962 3 Sheets-Sheet 3

INVENTOR.
John D. McMichael
BY Frederick M. Ritchie
His Attorney

3,189,179
REPLACEABLE FILTER CARTRIDGE FOR A DRY CLEANER

John D. McMichael, Swarty Creek, Mich., assignor to General Motors Corporation, Detroit, Mich., a corporation of Delaware
Filed July 18, 1962, Ser. No. 210,651
4 Claims. (Cl. 210—238)

This invention relates to dry cleaning apparatus and more particularly to an improved filter element for filtering and conditioning dry cleaning solvent.

The public acceptance of self-service dry cleaning apparatus has given rise to many different dry cleaning systems. One such system uses a throw-away filter cartridge which is disposed in the path of circulating solvent for removing particulate matter therefrom and for conditioning the solvent by adsorbing dyes or the like. A filter cartridge suitable for use in this growing industry must be efficient, have a long life in cycles of operation and be inexpensive to manufacture.

Accordingly, it is an object of this invention to provide an improved filter cartridge for dry cleaning solvent, such as perchloroethylene.

It is still another object of this invention to provide an improved multi-stage filter cartridge wherein the means forming the separate stages are fabricated as separate subassemblies, these subassemblies being subsequently joined by paint can lid type elements to form the complete cartridge.

Further objects and advantages of the present invention will be apparent from the following description, reference being had to the accompanying drawings wherein a preferred embodiment of the present invention is clearly shown.

Figure 3:
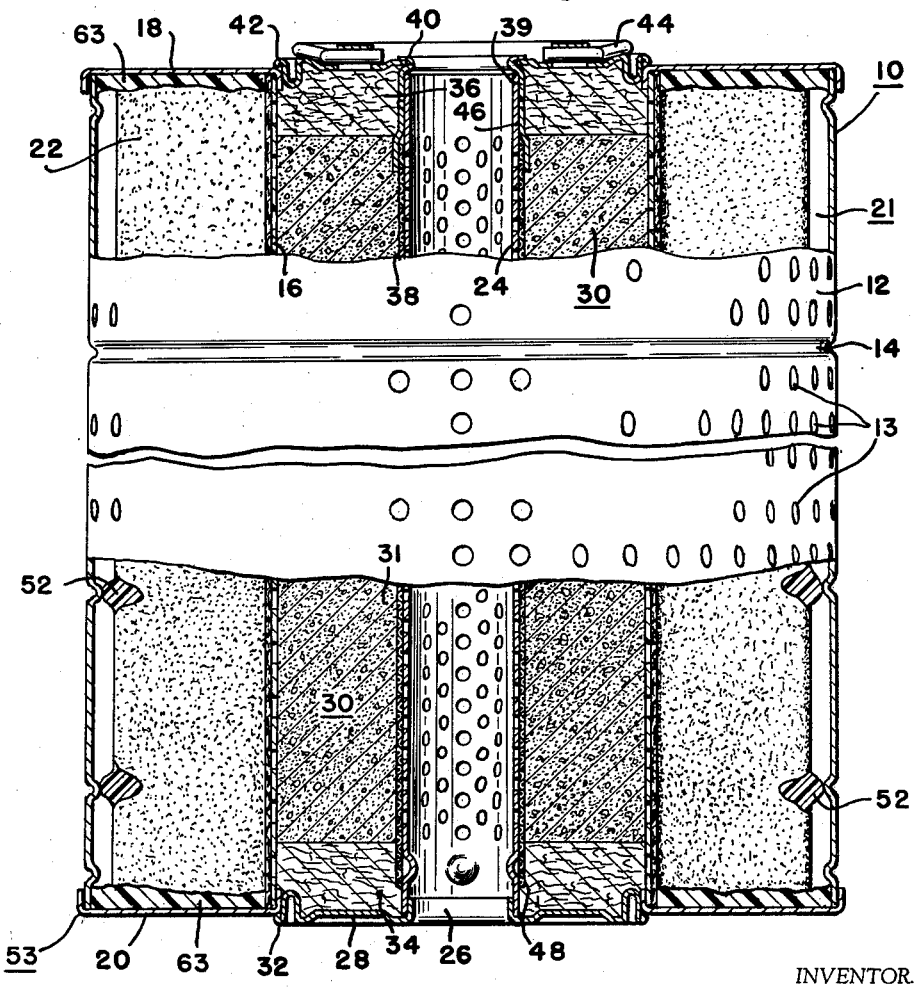
FIGURE 3 is a fragmentary, diametrical, side sectional view of the completely assembled filter cartridge.
Figure 4:
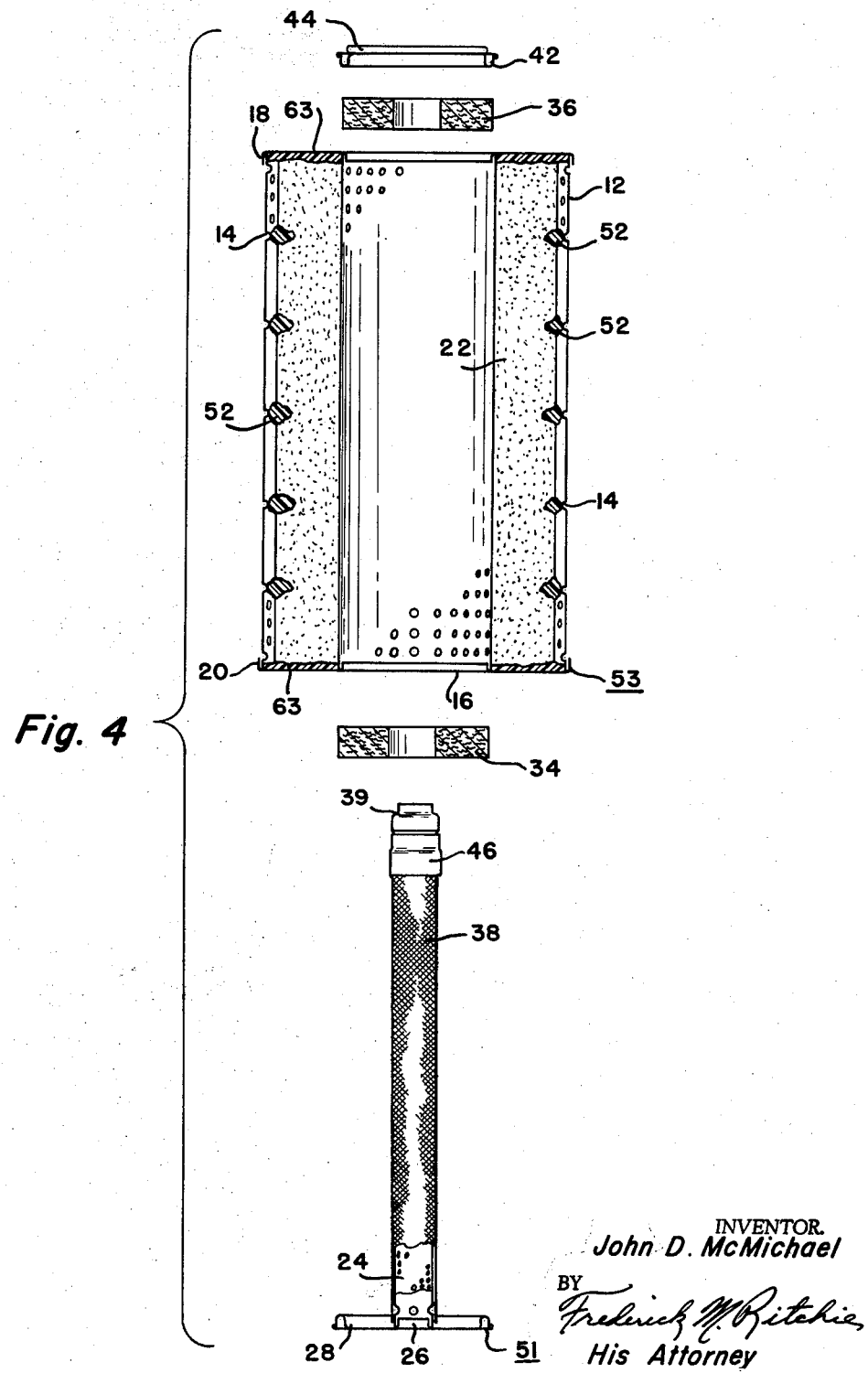
FIGURE 4 is an exploded schematic sectional view illustrating the manufacturing method of this invention.

In accordance with this invention and with reference to FIGURE 3, a cleaning fluid filter element assembly 10 approximately 14 inches long by 7.6 inches in diameter is illustrated which is suitable for use with the dry cleaner disclosed in copending application Serial No. 105,733, filed April 26, 1961, now abandoned and refiled as continuation application Ser. No. 285,189 which issued May 12, 1964, as Patent 3,132,501, and assigned to the same assignee as this invention. The cartridge 10 is adapted to be placed in intercepting relationship with dry cleaning solvent, such as perchloroethylene, and is adapted to be removable and disposable when its resistance to solvent flow radially inwardly therethrough exceeds a certain predetermined value.

The cartridge 10 is comprised of an inside lock-seamed, cylindrical, perforated, outer shell 12 having several radially inwardly directed grooves 14 for spacing certain internal components of the cartridge as will be described hereinafter. The outer shell may be tin plate and should have a plurality of spaced holes or ports 13, 0.187 inch in diameter, over its entire surface except where the grooves or internal beads 14 are formed. The outer perforated shell serves to protect the filter cartridge, holds the cartridge together and acts as the inlet for the solvent moving radially inwardly through the cartridge.

A perforated cylindrical support or separator tube 16 of tin palte is spaced from the outer shell 12 by an annular upper end plate 18 and an annular lower end plate 20 also of tin plate and parallel to said upper end plate. The perforated cylinders 12 and 16 form therebetween a first stage solvent filtering chamber 21 to receive a tubular element 22 of folded or accordian plaited filter paper. The paper filter element 22 is adapted to remove from the solvent such contaminants as dirt, lint, hair, etc., i.e. particulate matter.

Figure 1:
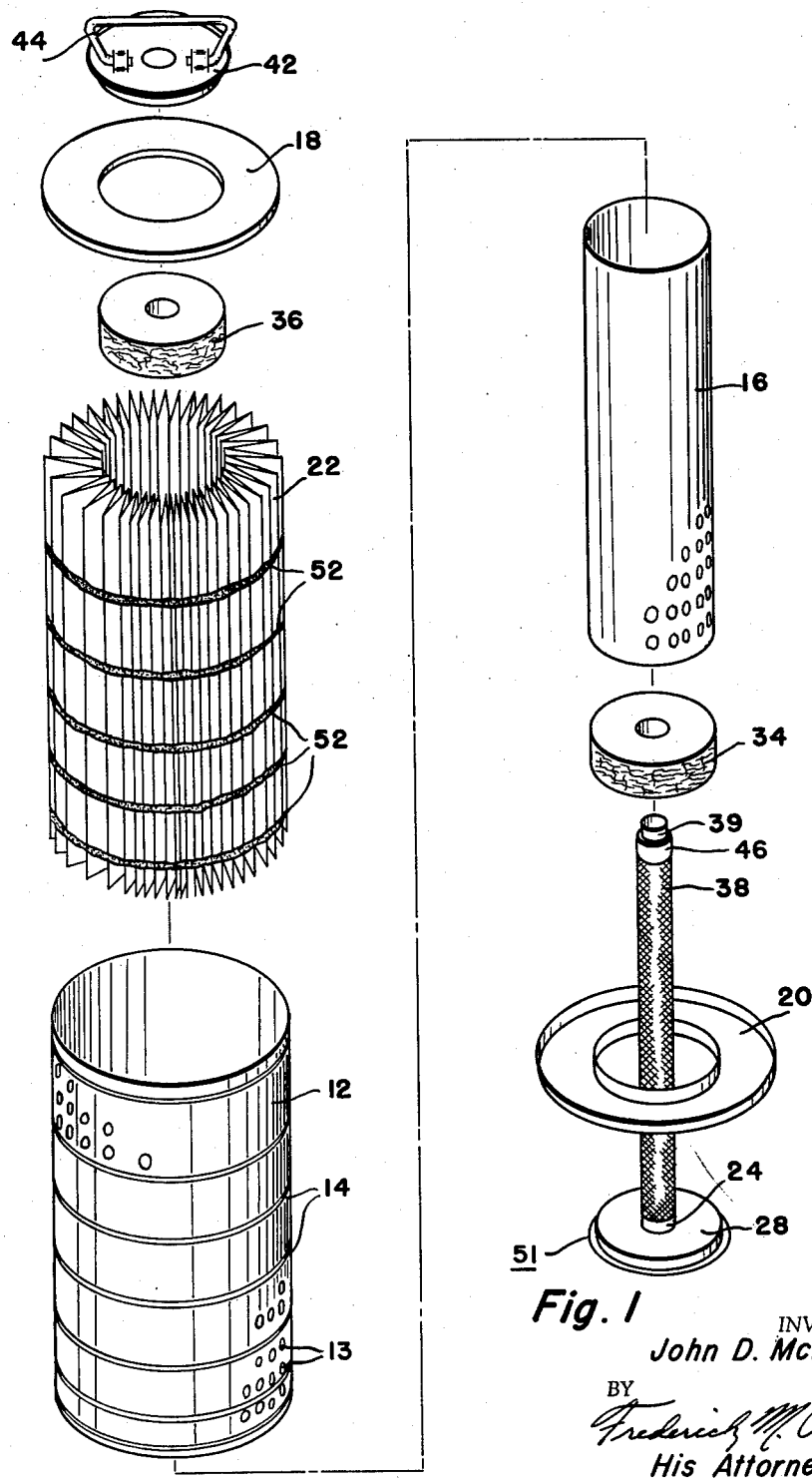
FIGURE 1 is an exploded perspective view of the disposable filter cartridge of this invention.
Figure 2:
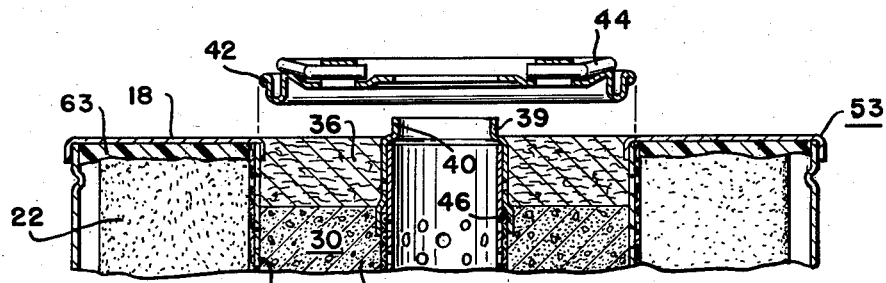
FIGURE 2 is a fragmentary, diametrical, side sectional view, partly in elevation and partly exploded, to illustrate the method of final assembly.

A cylindrical center or outlet tube 24 of tin plate is perforated with 0.12 inch diameter holes over its entire surface and fastened as by spot welding in the middle of the cartridge on an inturned cylindrical collar 26 of an otherwise imperforate lower cover 28. The inner center tube 24 defines with the separator or support tube 16 a second stage or solvent conditioning chamber 30. A metal ferrule 39 is spot welded to the top of the center tube 24 and includes an initially cylindrical flange 40 (FIGURE 2) which is subsequently spun or crimped over (FIGURE 3) to fasten the tube at the other end of the cartridge. The lower cover 28 is formed like a paint can lid at its outer periphery to frictionally engage in a press fit the inner peripheral edge 32 of the lower end plate 20. Enveloping the center tube 24 is a wrapping of plastic cloth 38, such as Saran cloth, which is lapped along the length of the tube and heat sealed the full length of the lap. Tape 46 may be wrapped around the upper end of the center tube to secure the exposed end of the plastic cloth. A similar protective wrap (not shown) could be placed around the cloth at the opposite end 48 of the center tube. This, then, completes the lower cover and center tube assembly 51 comprised of the lower cover 28, center tube 24, plastic cloth 38, ferrule 39 and protective wrapper 46.

The solvent conditioning chamber 30 is filled with approximately two pounds of activated carbon 31 which is granular in form and effective to remove dyes and other dissolved contaminants. To retain the granular carbon, the solvent conditioning chamber 30 is sealed at its lower end by an annular lower end pad 34 of jute or other suitable material while the upper end of the chamber 30 is sealed by an annular end pad 36 also of jute. Cooperating with the end pads 34 and 36 in sealing the solvent conditioning chamber 30 is the aforesaid center tube plastic cloth wrapper 38.

If the granular-type activated carbon is not properly contained in the replaceable dry cleaning filter element, the fine carbon particulates will migrate from the filter cartridge by way of the center outlet tube 24. This migrated carbon can streak the clothes being dry cleaned with the fine carbon particles. To reduce the carbon migration to a minimum, the Saran cloth is wrapped and heat sealed about the center tube 24. The filtering characteristics of the Saran cloth are such that it will reduce the granular carbon migration to a tolerable level but will not plug itself off by the fine carbon and fine particulate matter which passes through the paper element 22.

The selection of the proper material for the center tube wrap is quite important because the center tube wrap represents only a small filter area (0.3 square foot versus 38 square feet for the paper filter 22). If the center tube wrap filter is too fine, the wrap can become plugged, thereby reducing the cartridge's filtering life. It should be recognized that woven synthetic materials other than Saran plastic could also be used to prevent carbon migration.

A top cover 42 having a rolled or upset edge, paint can lid type design frictionally engages the radially inner peripheral edge of the upper end plate 18 and includes a central opening for receiving the spun over flange 40 of the ferrule 39 to lock the cover 42 in place. A bail or other suitable handle 44 may be fastened to the top cover 42 in any suitable manner to facilitate handling of the cartridge 10.

The filter paper tube or element 22 is formed from a blank of longitudinally corrugated filter paper approximately 385 inches long by 14 inches wide. The paper has 0.05 inch I.R. corrugations 49 spaced (ridge to ridge) 0.14 inch apart, the corrugations effecting an overall minimum thickness to the paper of 0.015 inch after folding. The paper is folded across the corrugations into 108 plaits or folds having a depth of 1.78 inches. Before wrapping into tubular form for the cartridge, the compressed folded filter paper is held in a fixture or frame 24 inches long. The paper folds space themselves evenly because of the springiness or resilience of the folded paper and the uniformity with which the paper blank is machine folded. It should be obvious that, if the filter paper in its folded form were not retained in the frame, the paper would uncoil or relax to a much greater length, much as would the release of a tightly wound coil spring.

In accordance with one object of this invention controlled spacing between the paper folds is provided by five beads 52 of plastisol adhesive laid down by nozzles on the upper face of the compressed to size filter element. These strips of plastisol adhesive are flowed down across the folds in amounts adequate to form a bead of adhesive between each fold to a maximum depth of 0.5 inch and overlaying the edge of the fold. This adhesive is then partially cured in an oven so that, when cooled, there is sufficient mechanical strength to hold the folded element to its predetermined length of 24 inches.

After the adhesive has partially cured, the 24 inch length of folded paper may now be handled and wrapped into the tubular form of the element 22. In its wrapped or rolled tubular form, note that the plastisol beads 52 (FIGURE 3) on the outside surface of the tubular paper element 22 align themselves respectively with the internal ribs 14 on the outer shell. This prevents the shell and the paper from rubbing and adds additional wear resistance and life to the cartridge. As the filter paper element 22 is wrapped into a tube, the free ends are coated with adhesive such as plastisol along the full length of the fold and sealed to each other.

The folded paper element is now ready for placement and inclusion as a component of the outer filter assembly 53 comprised also of the outer shell 12, support tube 16 and end plates 18 and 20. It should be noted that the upper and lower edges of the paper element 22 are sealed into their respective end plates with a film 63 of adhesive, such as plastisol, between 0.06 and 0.08 inch thick before the outer assembly is complete. The entire outer assembly 53 is then placed in an oven for final cure of both the adhesive and the resins which stiffen the paper.

The final assembly of the filter cartridge 10 may now be completed. The lower cover and center tube assembly 51 is pressed into the bottom of the outer filter assembly 53. Note the simple manner in which the curled edge of the paint can lid design effects this connection. Next, the end pad 34 is slipped over the upper end of the center tube 24 and forced downwardly against the cover. The chamber 30 is filled with carbon. Following this, the upper end pad 36 is slipped in place and the upper cover 42 pressed on—the paint can lid design again simplifying the procedure. The flange 40 of the ferrule 39 is crimped over to secure the assembly. When the bail or handle 44 is put into place, the filter cartridge 10 is complete.

The foregoing method of assembly wherein a paint can lid design is incorporated allows the cartridge to be assembled in separate sections or subassemblies so that each subassembly can be independent for fabrication and inspection. This method prevents the carbon stage from mixing with the other media and destroying the sealing area at the ends of the paper element. When complete, this design assures a tight seal to prevent leaks at the end plates. Also, the paint can lid design makes it easier to compensate for the tolerance stack on the overall length of the element.

While the embodiment of the present invention as herein disclosed constitutes a preferred form, it is to be understood that other forms might be adopted.

What is claimed is as follows:

1. A disposable cartridge for use with dry cleaning solvent comprising:

a perforated cylindrical outer shell adapted to receive through the perforations thereof solvent to be filtered and conditioned, a perforated center tube concentric with said outer shell and having one end open for dispensing filtered and conditioned solvent therethrough, a perforated support tube concentric with said outer shell and said center tube and interposed therebetween in a manner to place the perforations of said outer shell, support tube and center tube in sequential flow relationship, an annular imperforate end plate at each end of said cartridge connecting said outer shell and said support tube in spaced relationship respectively along the outer and inner peripheral edges of said end plates to define an annular solvent filtering chamber and a center cavity, a tube of longitudinally folded filter paper in said filtering chamber for removing particulate matter from solvent flowing therethrough, said outer shell, said support tube, said end plates and said tube of filter paper forming an outer filter assembly, a lower cover having a yieldable press-fit edge and a solvent outlet means in communication with said one end of said center tube, said center tube being fastened at said one end to said lower cover in a manner to support said center tube generally perpendicular thereto, plastic cloth means enveloping said center tube, said plastic cloth means, said center tube and said lower cover forming a lower cover and center tube assembly, said yieldable press-fit edge on said lower cover frictionally engaging the inner peripheral edge of one of said end plates, for joining said lower cover and center tube assembly to said outer filter assembly and for supporting said center tube in said center cavity in a manner to define with said support tube an annular solvent conditioning chamber, activated carbon granules in said conditioning chamber for removing soluble matter from solvent flowing therethrough, means for retaining said carbon granules in said conditioning chamber including plug means at each end of said conditioning chamber extending from said support tube to said center tube, an upper cover having a yieldable press-fit edge frictionally engageable wth the inner peripheral edge of the other of said end plates, and means for locking said upper cover to the other end of said center tube when said upper cover is engaged with said inner peripheral edge, said last named means including a central port on said upper cover and an annular terminal flange on said center tube in crimped together relationship.

2. A disposable cartridge for use with dry cleaning solvent comprising:

a perforated cylindrical outer shell adapted to receive through the perforations thereof solvent to be filtered and conditioned, a perforated center tube concentric with said outer shell and having one end open for dispensing filtered and conditioned solvent therethrough, a perforated support tube concentric with said outer shell and said center tube and interposed therebetween in a manner to place the perforations of said outer shell support tube and center tube in sequential flow relationship, an annular imperforate end plate at each end of said cartridge connecting said outer shell and said support tube in spaced relationship respectively along the outer and inner peripheral edges of said end plates to define an annular solvent filtering chamber and a center cavity, a tube of longitudinally folded filter paper in said filtering chamber for removing particulate matter from solvent flowing therethrough, said outer shell, said support tube, said end plates and said tube of filter paper forming an outer filter assembly, a lower cover having solvent outlet means in communication with said one end of said center tube, said center tube being fastened at said one end to said lower cover in a manner to support said center tube generally perpendicular thereto, plastic cloth means enveloping said center tube, said plastic cloth means, said center tube and said lower cover forming a lower cover and center tube assembly, said lower cover having a yieldable press-fit edge frictionally engaging the inner peripheral edge of one of said end plates, for joining said lower cover and center tube assembly to said outer filter assembly and for supporting said center tube in said center cavity in a manner to define with said support tube an annular solvent conditioning chamber, activated carbon granules in said conditioning chamber for removing soluble matter from solvent flowing therethrough, means for retaining said carbon granules in said conditioning chamber including said plastic cloth means and plug means at each end of said conditioning chamber extending from said support tube to said center tube, an upper cover having a yieldable press-fit edge frictionally engageable with the inner peripheral edge of the other of said end plates after said outer filter assembly and said lower cover and center tube assembly are joined, and means for locking said upper cover to the other end of said center tube when said upper cover is engaged with said inner peripheral edge, said last named means including a central port on said upper cover and an annular terminal flange on said center tube in crimped together relationship.

3. A disposable cartridge for use with dry cleaning solvent comprising a perforated cylindrical outer shell adapted to receive solvent to be filtered and conditioned, a perforated inner tube concentric with said outer shell and having one end open for dispensing conditioned solvent therethrough, a perforated support tube concentric with said outer shell and said inner tube and interposed therebetween, an annular imperforate end plate at each end of said cartridge connecting said outer shell and said support tube in spaced relationship respectively along the outer and inner peripheral edges of said end plates to define an annular solvent filtering chambers and a center cavity, a first cover frictionally engaging the inner peripheral edge of one of said end plates in a press fit and having solvent outlet means in communication with said one end of said inner tube, said inner tube being fastened at said one end to said first cover in a manner to support said inner tube in said center cavity thereby to define with said support tube an annular solvent conditioning chamber, a tube of longitudinally folded filter paper in said filtering chamber for removing particulate matter from solvent flowing therethrough, activated carbon granules in said conditioning chamber for removing soluble matter from solvent flowing therethrough, means for retaining said carbon granules in said conditioning chamber including plug means at each end of said conditioning chamber extending from said support tube to said inner tube, a second cover frictionally engaging the inner peripheral edge of the other of said end plates in a press fit and having means for lockingly receiving the other end of said inner tube, and means connected to said second cover for handling said cartridge.

4. A disposable cartridge for use with dry cleaning solvent comprising a perforated cylindrical outer shell adapted to receive solvent to be filtered and conditioned, a perforated inner tube concentric with said outer shell and having one end open for dispensing conditioned solvent therethrough, a perforated support tube concentric with said outer shell and said inner tube and interposed therebetween, an annular imperforate end plate at each end of said cartridge connecting said outer shell and said support tube in spaced relationship respectively along the outer and inner peripheral edges of said end plates to define an annular solvent filtering chamber and a center cavity, a first cover frictionally engaging the inner peripheral edge of one of said end plates in a press fit and having solvent outlet means in communication with said one end of said inner tube, said inner tube being fastened at said one end to said first cover in a manner to support said inner tube in said center cavity thereby to define with said support tube an annular solvent conditioning chamber, a tube of longitudinally folded filter paper in said filtering chamber for removing particulate matter from solvent flowing therethrough, activated carbon granules in said conditioning chamber for removing soluble matter from solvent flowing therethrough, a second cover frictionally engaging the inner peripheral edge of the other of said end plates in a press fit and having means for lockingly receiving the other end of said inner tube, and means for retaining said carbon granules in said conditioning chamber.

References Cited by the Examiner

UNITED STATES PATENTS

| | | | |
|---|---|---|---|
| 2,537,992 | 1/51 | Gross et al. | 210—315 X |
| 2,654,483 | 10/53 | Ahlijian | 210—458 |
| 2,822,201 | 2/58 | Wood | 210—470 |
| 2,855,103 | 10/58 | Wilkinson | 210—315 |
| 3,062,377 | 11/62 | Howard et al. | 210—338 |

FOREIGN PATENTS 528,054  10/54  Belgium.

REUBEN FRIEDMAN, *Primary Examiner.*

HARRY B. THORNTON, HERBERT L. MARTIN,
*Examiners.*